Jan. 26, 1937. E. J. DELAHANTY 2,068,734
VEHICLE WHEEL SUSPENSION
Filed July 12, 1934
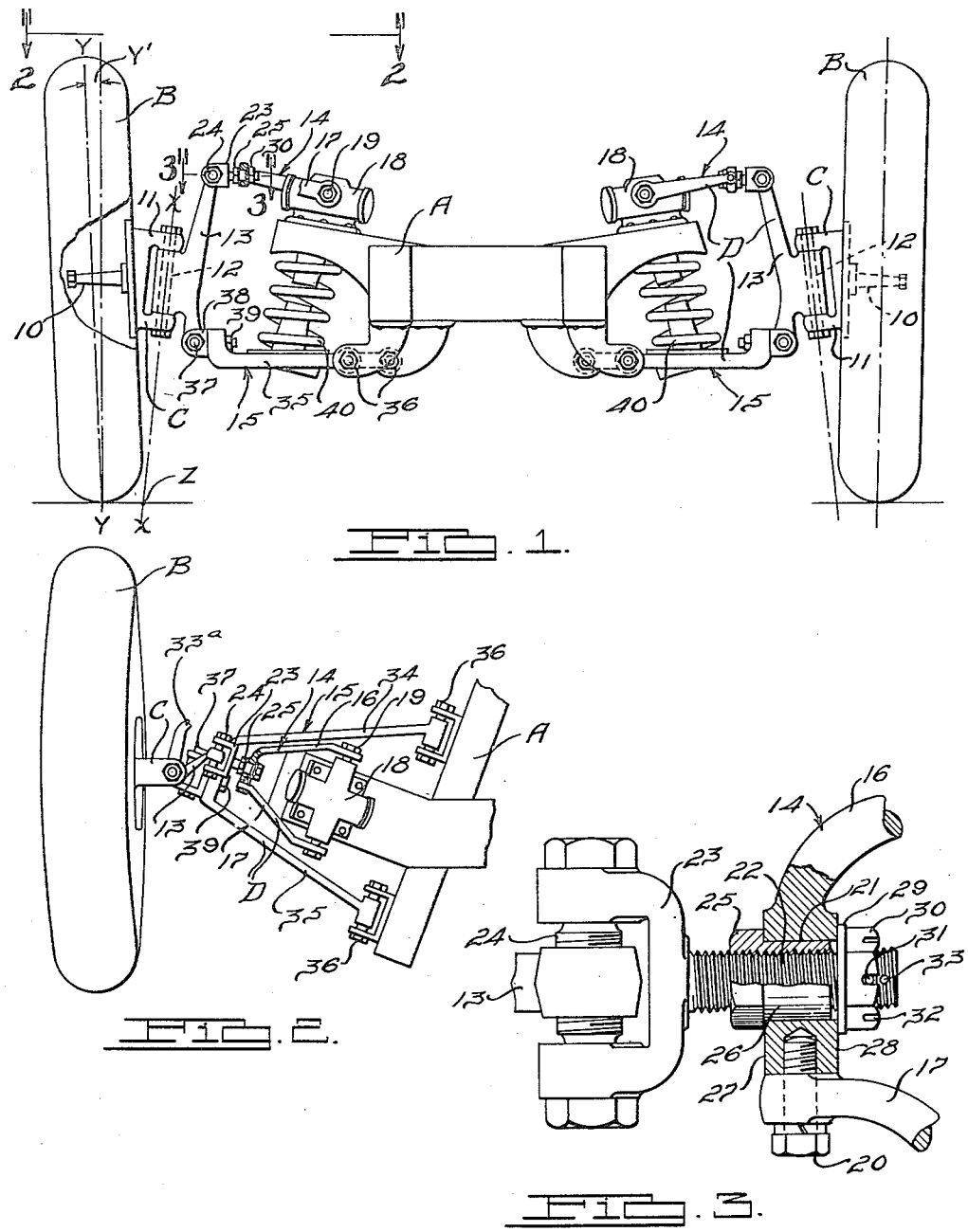
INVENTOR.
Edward J. Delahanty.
BY
Harness, Lind, Patee & Harris
ATTORNEYS.

Patented Jan. 26, 1937

2,068,734

UNITED STATES PATENT OFFICE 2,068,734

VEHICLE WHEEL SUSPENSION

Edward J. Delahanty, Detroit, Mich., assignor to Chrysler Corporation, Detroit, Mich., a corporation of Delaware Application July 12, 1934, Serial No. 734,721

15 Claims. (Cl. 280—124)

This invention relates to wheel suspensions for vehicles and refers more particularly to so-called independent wheel suspensions for motor vehicles.

In suspensions of the type mentioned above, it is important to provide a predetermined desired wheel alignment, and in connection with the steering wheels it is particularly desirable to maintain accuracy in the mounting of such wheels to provide the desired degree of camber. Failure to maintain the aforesaid characteristics may, and often does, result in excessive tire wear, difficult steering, shimmy or tramp of the steering wheels, and other undesirable effects.

In actual production difficulty has been experienced in maintaining the aforesaid characteristics in keeping with practical limitations of cost, workmanship, manufacturing tolerances, and the like.

It is an object of my invention to overcome the aforesaid undesirable effects and difficulties in an improved manner.

A further object of my invention resides in the provision of an improved wheel suspension particularly adapted for manufacture at relatively low cost.

A further object of my invention resides in the provision of an improved wheel suspension capable of manufacture in keeping with ordinary practical limitations of manufacturing tolerances.

A still further object of my invention is to provide improved means for adjusting a vehicle steering wheel for camber without requiring disassembly of the suspension.

In carrying out the objects of my invention, I preferably provide suitable means in the wheel suspension mechanism for conveniently and accurately compensating for any inaccuracies introduced in the manufacture and assembly of the parts thereof. Thus, by reason of my novel compensating means, any inaccuracies in wheel camber may be readily corrected.

Further objects and advantages of my invention will be apparent from the following detailed description of my invention, reference being had to the accompanying drawing in which I have shown one form which my invention may assume by way of example and illustration.

In the drawing, in which like reference characters represent corresponding parts throughout the several views, Fig. 1 is a front elevational view of the forward vehicle steering wheels showing my improved suspension mechanism therefor.

Fig. 2 is a top plan view of my wheel suspension, the view being taken as indicated by the line 2—2 of Fig. 1.

Fig. 3 is a detail sectional view of the upper connector illustrating my adjusting means, the section being taken along the line 3—3 of Fig. 1.

In the drawing, reference character A represents the frame or load carrying structure of the motor vehicle, the body, engine, and driving parts of the motor vehicle being omitted for clarity in my disclosure since such parts are well known in the art and may be of any desired form and arrangement.

I have illustrated my invention in connection with the forward steering ground wheels B of the motor vehicle, each wheel being journaled on a spindle 10 of the wheel supporting means C. This wheel supporting means for each of the wheels B is also preferably formed with bearings 11 for receiving a king-pin 12 providing swiveling of the steering wheel about the axis X—X of the king-pin or steering knuckle pivot.

As the parts associated with each of the wheels B are similar, the description for the most part will be limited to one of the wheels and parts associated therewith.

The wheels B in their normal positions illustrated in Fig. 1 are preferably cambered so that the plane Y—Y of each wheel extends upwardly and outwardly at an inclination to the vertical, the camber angle being designated at Y' in Fig. 1. The desirability of camber for steering wheels is generally accepted and understood and when axis X—X lies along the intersection of plane Y—Y with the ground, then the traction resistance of the wheel has no effective lever arm. It is generally desirable to arrange the king-pin so that its axis X—X intersects the ground a small distance inside plane Y—Y as represented by the point Z in Fig. 1 in order to provide a lever arm tending to restore the wheel to its straight-ahead position.

In order to support the frame structure A by the wheels B and to provide substantially independent suspension or springing movement of each of the wheels relative to each other, I have provided the connecting means D intermediate the frame and the wheel supporting means C. This connecting means includes an arm 13 associated with each of the wheels B, each arm being adapted to support or carry a king-pin 12 by reason of the bearing portion thereof which lies between the spaced bearings 11.

Arm 13 extends generally vertically in the sense that the ends thereof are positioned in spaced relation, the connecting means D, in the illustrated embodiment of my invention, being arranged in a substantially trapezoidal shape. Thus, during a displacement of the wheel, the track between wheels B remains practically unchanged when either wheel strikes a depression or encounters a bump in the roadway. The linkage or connecting means D, while of the general parallelogram type, is preferably arranged in the form of a rectangle and more particularly in the form of a trapezoid defined by various supports for the linkage parts.

Extending generally laterally or transversely of the vehicle are the upper and lower linkages or connectors 14 and 15 respectively, these connectors being of the so-called wishbone type or generally V-shaped. Where the aforesaid trapezoidal arrangement of linkage is desired, connector 15 is somewhat longer than connector 14 as illustrated, this arrangement deviating somewhat from a true parallelogram but providing substantially vertically guided movement of the point of wheel tread contact with the ground on displacement of the wheel. Connector 14 has its arms 16 and 17 thereof diverging toward frame A for pivotal connection therewith. With this in view the frame structure A may rigidly support a shock absorber 18 of any suitable type having an oscillating actuating shaft or pivot pin 19 to which the inner ends of arms 16 and 17 are connected. Thus, shaft 19 forms the pivotal support for the arms of connector 14 and, if desired, such shaft may be supported directly by the frame structure. The shock absorber, in effect, constitutes a frame bracket for the pivot pin 19.

For convenience of manufacture and assembly, arm 16 may be assembled to arm 17 by fasteners 20, the resulting wishbone 14 providing a rigid linkage. At the outer end of connector 14 substantially at the intersection of arms 16 and 17, the connector is formed with a cylindrical opening 21 therethrough receiving in spaced relationship the inwardly extending threaded shank or stem 22 of the adjustable connector member 23 which projects outwardly and inwardly from the connector 14. This adjustable member is outwardly forked to receive the threaded pin 24 which lies transversely with respect to the stem 22. This pin 24 pivotally supports the upper end of arm 13 between the forks of the adjustable member 23.

Threaded on the stem 22 is a headed bushing member formed with the head or nut portion 25 and the inwardly extending bushing portion 26. The bushing 26 fills the space between opening 21 and stem 22 and the nut 25 bears against the outer flat face 27 of the connector 14. The weight of the vehicle normally acts through the suspension linkage to urge the stem 22 inwardly and to thereby urge the nut 25 against the face 27. Bearing against the inner flat face 28 of connector 14 is a lock washer 29 and lock nut 30 threaded on the inwardly projecting end of stem 22. The nut 30 may be additionally locked by a pin 31 selectively engageable with slots 32 in nut 30 and holes 33 in stem 22.

The wheels B may be rotated about their kingpins 12 in any well-known manner to effect vehicle steering, a portion of a steering arm 33a being shown in Fig. 2. By reason of the pivot pins 19 and 24, the connector 14 may pivotally swing with respect to frame A and arm 13 in guiding the wheel when displacement thereof occurs as aforesaid. Connector 15 is illustrated as the wishbone type generally similar in form to the upper connector 14. Thus, the lower connector 15 is likewise formed with arms 34 and 35 which, although somewhat longer than the corresponding arms 16 and 17 of connector 14, diverge toward the frame A in generally similar manner for pivotal connection therewith by reason of the pivot pins 36. The connector 15 may be likewise provided with an adjustable forked member similar to the Fig. 3 arrangement although in my drawing I have shown the lower end of arm 13 pivoted to a pin 37 carried in a bracket 38 secured to the lower connector 15 by an adjustable bolt and pin assembly 39 which extends at right angles to the pin 37. Connectors or linkages 14 and 15 cooperate with arm 13 to impart the desired guided movement to the wheel on displacement thereof.

The vehicle frame structure A and the load carried thereby is yieldingly supported by the wheel supporting means C and connecting means D by reason of suitable springs illustrated at 40 intermediate the frame structure and lower connector 15. If desired, other forms of connectors and springing means may be provided and it is not my intention to limit my invention in the broader aspects thereof to the particular form and arrangement of such parts as shown for purposes of illustration.

From the foregoing reference to the desirable characteristics of wheel geometry, it follows that, prior to the teachings of my invention, it would be necessary to maintain at undesirably high cost an unusually high degree of machining tolerances and skill in assembly and general workmanship if these desirable characteristics are to be obtained with the desired degree of precision in the production of motor vehicles. These objectionable factors are most pronounced in the so-called independently sprung wheels to which class my invention particularly relates. My invention will compensate for inaccuracies in the various parts of the linkage forming a wheel suspension mechanism in an improved manner.

In overcoming the aforesaid difficulties and expense I have provided means for adjusting the normal position of any ground wheel whereby to conveniently and accurately compensate for errors introduced during the manufacture and assembly processes, as well as during the life of the motor vehicle from a service adjustment standpoint. My adjusting means is furthermore operable after assembly of the wheel suspension and without requiring disassembly of the parts, jacking the car up, or other operations beyond the manipulation of the adjusting means.

In operation of my improved adjusting means let it be presumed that it is desired to increase the camber angle Y'. Such adjustment is readily obtained by giving the lock nut 30 a few turns on the threaded stem 22 inwardly from the inner face 28 of the connector 14 followed by a rotative adjustment of the nut 25, the threaded stem 22 being thereby moved outwardly to swing the upper end of arm 13 outwardly and thereby increase the camber angle Y'. After the desired setting of the camber angle is obtained, the lock nut 30 is securely seated against the inner face 28 of the connector 14 whereupon the adjustable member 23 will be again rigidly secured to the connector 14. The adjustment is, of course, made while the vehicle is at rest and under such conditions the weight of the vehicle will urge the adjustable connector member 23 inwardly so that after loosening the lock nut 30 the adjustment for camber may be readily made by imparting the desired number of turns to the adjusting nut 25.

It will be apparent that by reversing the direction of adjusting rotation of nut 25, the camber angle Y' may be reduced as desired. It will furthermore be apparent that the bushing portion 26 will rotate in the opening 21 of connector 14 when the nut portion 25 is adjusted, this bushing portion journaling the threaded stem 22 in an improved manner with the connector 14.

I desire to point out that various modifications and changes will be apparent from the teachings of my invention and I do not limit my invention in its broader aspects to the particular combination and arrangement of parts which I have shown by way of example.

What I claim is:

1. In a suspension for a steering ground wheel of a motor vehicle having a frame structure, wheel supporting means including a substantially vertically extending arm, upper and lower linkages intermediate said frame structure and said arm, an adjustable connector between said arm and one of said linkages, said connector having a threaded stem, and a headed bushing threaded on said stem and engaging the last said linkage and adapted to adjust said stem laterally of the vehicle to vary the wheel camber.

2. In a suspension for cambered ground wheel of a motor vehicle having a frame structure, wheel supporting means including a knuckle bracket, link means intermediate said frame structure and one end of said knuckle bracket for guiding displacement of said wheel, a connector member between said knuckle bracket end and said link means, said connector member having a stem, and rotatable means threaded on said stem and adapted on rotation thereof to adjust said stem in its axial direction to vary the wheel camber, said rotatable means having a bushing portion intermediate said stem and said link means.

3. In a suspension for a cambered ground wheel of a motor vehicle having a frame structure, wheel supporting means including a knuckle bracket, link means intermediate said frame structure and one end of said knuckle bracket for guiding displacement of said wheel, a connector member between said knuckle bracket end and said link means, said connector member having a stem, and a nut threaded on said stem between said knuckle bracket end and said link means and adapted on rotation thereof to adjust said stem in its axial direction to vary the wheel camber, said nut having a bushing portion journalling said stem in said link means.

4. In a suspension for a cambered ground wheel of a motor vehicle having a frame structure, wheel supporting means including a knuckle bracket, link means intermediate said frame structure and one end of said knuckle bracket for guiding displacement of said wheel, a connector member between said knuckle bracket end and said link means, said connector member having a stem, rotatable means threaded on said stem and adapted on rotation thereof to adjust said stem in its axial direction to vary the wheel camber, said rotatable means having a bushing portion intermediate said stem and said link means, and locking means for said stem and link means.

5. In a suspension for a cambered ground wheel of a motor vehicle having a frame structure, wheel supporting means including a knuckle bracket, link means intermediate said frame structure and one end of said knuckle bracket for guiding displacement of said wheel, a connector member between said knuckle bracket end and said link means, said connector member having a stem, a nut threaded on said stem between said knuckle bracket end and said link means and adapted on rotation thereof to adjust said stem in its axial direction to vary the wheel camber, said nut having a bushing portion journalling said stem in said link means, and a second nut threaded on said stem for locking said stem to said link means.

6. In a suspension for a cambered ground wheel of a motor vehicle having a frame structure, wheel supporting means including a knuckle bracket, link means intermediate said frame structure and one end of said knuckle bracket for guiding displacement of said wheel, a connector member between said knuckle bracket end and said link means, said connector member having a stem, a nut threaded on said stem between said knuckle bracket end and said link means and adapted on rotation thereof to adjust said stem in its axial direction to vary the wheel camber, said nut having a bushing portion journalling said stem in said link means, a washer engaging said link means between said frame structure and said bushing portion, and a second nut threaded on said stem and engaging said washer for locking said stem to said link means.

7. In a suspension for a steering ground wheel of a motor vehicle having a frame structure, wheel supporting means including a substantially vertically extending arm, upper and lower linkages intermediate said frame structure and said arm, an adjustable connector between said arm and one of said linkages, said connector having a threaded stem, and a headed bushing threaded on said stem and engaging the last said linkage and adapted to adjust said stem laterally of the vehicle to vary the wheel camber, the wheel suspension being so arranged that the stem is normally urged toward the last said linkage.

8. In a suspension for a cambered ground wheel of a motor vehicle having a frame structure, wheel supporting means including a knuckle bracket, link means intermediate said frame structure and one end of said knuckle bracket for guiding displacement of said wheel, a connector member between said knuckle bracket end and said link means, said connector member having a stem, and a nut threaded on said stem between said knuckle bracket end and said link means and adapted on rotation thereof to adjust said stem in its axial direction to vary the wheel camber, said nut having a bushing portion journalling said stem in said link means, the wheel suspension being so arranged that the stem is normally urged in a direction to force said nut toward said link means.

9. In a vehicle wheel suspension, wheel supporting means including a knuckle bracket, wheel displacement guiding means including an element having an opening, wheel adjusting means between said bracket and said guiding means, said adjusting means including a member spaced within said opening, and a headed member threaded on said member and having a bushing portion positioned in the space between said opening and said member.

10. In a vehicle wheel suspension, wheel supporting means including a knuckle bracket, wheel displacement guiding means including an element having an opening, wheel adjusting means between said bracket and said guiding means, said adjusting means including a member spaced within said opening, and a headed member threaded on said member and having a bushing portion positioned in the space between said opening and said member, the wheel suspension being so arranged that said member forces said headed member into engagement with said guiding means.

11. In a vehicle wheel suspension, wheel supporting means including a knuckle bracket, wheel displacement guiding means including an element having an opening, wheel adjusting means between said bracket and said guiding means, said adjusting means including a member spaced within said opening, and a headed member threaded on said member and having a bushing portion positioned in the space between said opening and said member, said bushing portion being threaded on said member and rotatable in said opening.

12. In a suspension for a cambered wheel of a motor vehicle having a frame, wheel supporting means including a wheel supporting spindle and a knuckle bracket swivelled therewith, upper and lower connectors pivoted inwardly to said frame and adapted to pivotally guide said knuckle bracket for vertical displacement of said wheel, one of said connectors having an opening extending generally transversely to the plane of the wheel, an adjustable bracket having its outer end pivotally connected to one end of said knuckle bracket and having its inner end extending through said opening and spaced therewithin, and a bushing threaded on said adjustable bracket and fitting said opening and adapted on rotation thereof to adjust said adjustable bracket axially of said opening to vary the camber of the wheel.

13. In a suspension for a cambered wheel of a motor vehicle having a frame, wheel supporting means including a wheel supporting spindle and a knuckle bracket swivelled therewith, upper and lower connectors pivoted inwardly to said frame and adapted to pivotally guide said knuckle bracket for vertical displacement of said wheel, one of said connectors having an opening extending generally transversely to the plane of the wheel, an adjustable bracket having its outer end pivotally connected to one end of said knuckle bracket and having its inner end extending through said opening and spaced therewithin, and a bushing threaded on said adjustable bracket and fitting said opening and adapted on rotation thereof to adjust said adjustable bracket axially of said opening to vary the camber of the wheel, the last said connector having an outer face adjacent said opening, said bushing having a headed portion positioned outwardly of said opening and engaging said outer face.

14. In a suspension for a cambered wheel of a motor vehicle having a frame, wheel supporting means including a wheel supporting spindle and a knuckle bracket swivelled therewith, upper and lower connectors pivoted inwardly to said frame and adapted to pivotally guide said knuckle bracket for vertical displacement of said wheel, one of said connectors having an opening extending generally transversely to the plane of the wheel, an adjustable bracket having its outer end pivotally connected to one end of said knuckle bracket and having its inner end extending through said opening and spaced therewithin, a bushing threaded on said adjustable bracket and fitting said opening and adapted on rotation thereof to adjust said adjustable bracket axially of said opening to vary the camber of the wheel, and a lock nut engaging said adjustable bracket inwardly of said headed bushing portion for adjustably clamping said adjustable bracket to the last said connector.

15. In a suspension for a cambered wheel of a motor vehicle having a frame, wheel supporting means including a wheel supporting spindle and a knuckle bracket swivelled therewith, upper and lower connectors pivoted inwardly to said frame and adapted to pivotally guide said knuckle bracket for vertical displacement of said wheel, one of said connectors having an opening extending generally transversely to the plane of the wheel, an adjustable bracket having a forked outer end pivotally connected to one end of said knuckle bracket and having an inwardly extending threaded stem projecting through said opening, and a bushing threaded on said stem and slidably fitting within said opening, said bushing having a nut portion for rotating said bushing to adjust said stem axially for varying the camber of the wheel.

EDWARD J. DELAHANTY.